United States Patent
Sakai

(10) Patent No.: US 7,359,363 B2
(45) Date of Patent: Apr. 15, 2008

(54) REDUCED POWER AUTO-CONFIGURATION

(75) Inventor: Tsutomu Sakai, Cypress, CA (US)

(73) Assignee: Cisco Technology, Inc., San Jose, CA (US)

( * ) Notice: Subject to any disclaimer, the term of this patent is extended or adjusted under 35 U.S.C. 154(b) by 473 days.

(21) Appl. No.: 11/046,626

(22) Filed: Jan. 30, 2005

(65) Prior Publication Data

US 2006/0187865 A1    Aug. 24, 2006

(51) Int. Cl.
*H04Q 7/24* (2006.01)
(52) U.S. Cl. ............... 370/338; 370/328; 370/252; 455/522; 455/69
(58) Field of Classification Search ............ 370/338, 370/328, 252; 455/522, 69
See application file for complete search history.

(56) References Cited

U.S. PATENT DOCUMENTS

| 7,079,494 | B2* | 7/2006 | Marinier et al. ............ 370/252 |
| 7,174,134 | B2* | 2/2007 | Klein et al. ................... 455/69 |
| 2002/0003481 | A1* | 1/2002 | Kantola et al. ........ 340/825.77 |
| 2004/0229621 | A1* | 11/2004 | Misra ......................... 455/445 |
| 2005/0176452 | A1* | 8/2005 | Perlman ..................... 455/500 |
| 2006/0058053 | A1* | 3/2006 | Jatschka .................... 455/522 |

* cited by examiner

*Primary Examiner*—Danh Le
(74) *Attorney, Agent, or Firm*—MacPherson Kwok Chen & Heid LLP; Tom Chen

(57) ABSTRACT

An auto-configuration algorithm for establishing a wireless connection between an access point (AP) and a wireless station includes reducing the power that the AP transmits or broadcasts configuration setting information, resulting in possible reception of the configuration setting only within a small area of the network.

11 Claims, 6 Drawing Sheets

REDUCED POWER AUTO-CONFIGURATION

BACKGROUND

1. Field of Invention

The present invention relates generally to wireless local area networks (LANs), and more particularly automatic configuration of such wireless LANs.

2. Related Art

Wireless local area networks (WLANs), both in the office and home, are becoming more and more popular. One reason is that wireless users have greater mobility in using the wireless devices, such as laptops, to communicate with stationary base stations or access points (APs). This, then allows the wireless device to communicate with an external network, such as the Internet. The user is free to move the wireless device from network to network or within a local area network, without the inconvenience of connecting cables. However, one disadvantage of wireless devices is that communication through a wireless medium is less secure than through a wired connection. The wireless medium allows easier access to signals propagating through the medium. As a result, signals carrying restricted or confidential information, such as a user's personal data or a network's configuration parameters, are more easily intercepted by unauthorized users.

Consequently, various committees and organizations have proposed and implemented different standards and protocols for securing wireless transmissions. Some standards, protocols, and algorithms include WEP (Wired Equivalent Privacy), WPA (Wi-Fi Protected Access), and PSK/AES (Pre-Shared Key/Advanced Encryption Standard). However, even with the capability of increasing security to their wireless communications, many users do not implement such safeguards in their wireless systems. One reason that the set up, implementation, and maintenance of the security can be very complicated, e.g., requiring the user to input a series of complex security keys or codes. As a result, the user either cannot or does not want to perform all the necessary steps. This can become overly problematic since the user would need to associate the wireless mobile device to an AP each time it moves into a new network. Therefore, there may be many instances that a user's confidential information is vulnerable.

Companies have proposed and marketed various systems that simplify the security process for setting up and implementing a security system for wireless communications. One such company, Buffalo Technology, has developed a system that allows the user to set up a secured wireless network during initial configuration by initiating protocols from the wireless access point (AP) and the wireless device or client. The initialization and subsequent communication is effected by simply pushing a button on the AP and the client. This initiates a series of communication protocols to associate the two devices and establish a secure communication link between them. Such a system is called the AirStation One-Touch Secure System (AOSS™).

Even though this system makes it easier for the user to utilize the security protocols, there are still disadvantages. One large disadvantage is that when both devices are associating, other devices in the area may also be able to access the communication before a secure channel can be set up. This is because signals transmitted through a wireless medium can be intercepted by anyone within range of the signals. As a result, an unauthorized device may be able to acquire association parameters and IDs, which would then allow that device to access the network.

Therefore, there is a need for a configuration process for wireless devices that overcomes the disadvantages of conventional protocols discussed above.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

According to one aspect of the present invention, the power (such as RF power) that the access point (AP) transmits during initial auto-configuration of a wireless client is reduced, such as by a percentage of the maximum RF power or by fixed lower power levels. As a result, the chances of unauthorized reception of configuration information are greatly reduced because the receivable range of the AP transmission is confined to a much smaller area.

In one embodiment, both the AP and the wireless client are initiated in an auto-configuration mode, such as pushing a button on each device. The power level of the AP is set at a reduced level and the devices attempt to establish a wireless connection within a specific time frame. If no connection is established, the power level of the AP is increased and connection is attempted again. The power level of the AP is incrementally increased a pre-determined number of times until a secure wireless connection is established. Thus, the RF power transmitted by the AP is kept at a minimum level so that unauthorized devices farther away from the AP than the wireless client cannot intercept the AP broadcast communications.

Figure 1:
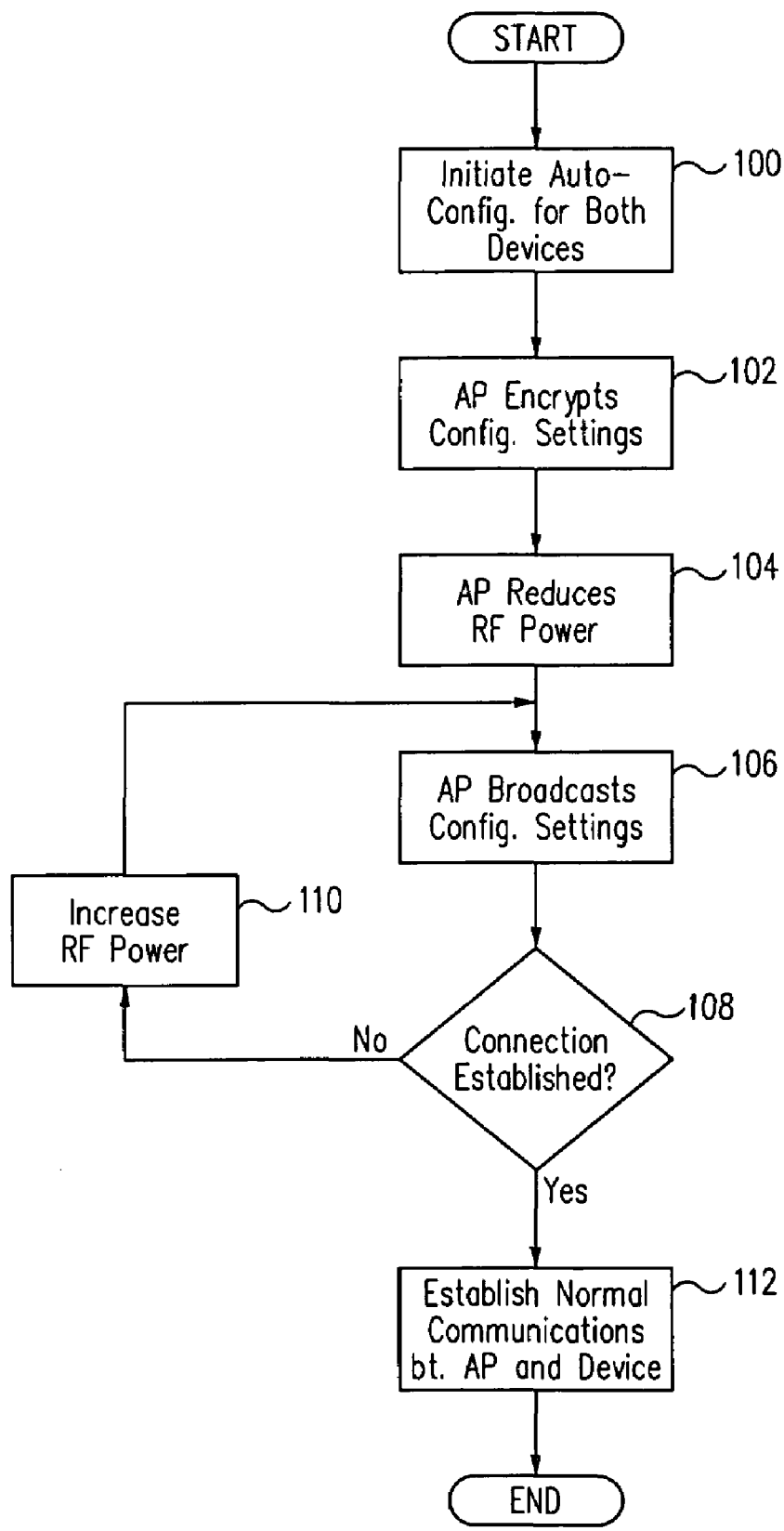
FIG. 1 is a flowchart illustrating an algorithm for establishing a secure wireless network connection between two devices in the network according to one embodiment.

FIG. 1 is a flowchart illustrating an algorithm for establishing a secure wireless network connection between two devices in the network, such as an AP and a laptop computer. When the laptop or wireless client enters a network and wishes to be connected, both the wireless client device and the access point are initiated for auto-configuration in operation 100. Initiation can be by simply pushing a button on each device, which would start an auto-configuration process, such as the AOSS system from Buffalo Technology. The wireless client may be initiated a time period after the auto-configuration starts, such as within two or three seconds. After at least the AP has been initiated, the AP encrypts, in operation 102, configuration settings, such as SSID, wireless protocol setting, and wireless security (WEP and WPA). The encryption can be by the APS own proprietary encryption mechanism.

Next, in operation 104, the AP reduces its RF broadcast or transmission power. The power reduction can be in various ways. For example, the power reduction can be a percentage of the maximum RF power, preset by the manufacturer, the user may select the power level, or the user may input the anticipated range of the wireless client and the AP may calculate the minimum power needed to communicate with the device. The amount of power reduction can be set before or after auto-configuration begins. Once the reduced power level is set, the AP transmits the encrypted configuration settings at this reduced RF power in operation 106. By reducing the transmitted RF power, less devices are able to intercept the transmission because the signals are within a more limited space. As a result, the chances of unauthorized users or devices having access to the network is reduced.

After transmission of the configuration settings, the AP and wireless device determine, in operation 106, whether a communication or connection is established. One reason a connection may not be established is that the RF power was too low, i.e., the intended wireless client was outside the range of the transmission. Thus, if it is determined that no communication was established, the AP increases its RF power in operation 110. The amount of RF power increase can be by a fixed level, set either by the user or the manufacturer. The increase can also be by a calculation made by the AP, factoring in the conditions of the attempted communication, including range, encryption, and environment. The AP then transmits the encrypted settings again at this increased power in operation 106, and a determination is made in operation 108 whether a connection has been established. The RF power transmitted by the AP is increased until a connection is established. When the AP and wireless client are configured for communication, a normal association processes occurs in operation 112 to allow secure communication between the AP and client.

In some embodiments, the power will only be increased 5 times or up to 20% of the maximum power. The time, number of tries, power level increase can be limited to increase security. For example, a connection may not be established because of a problem with the wireless client device and/or the AP. Another reason may be that the wireless client device has decided not to join the network and thus has left the network area. In these and other situations, it is disadvantageous for the AP to continue transmitting at higher and higher powers for an extended amount of time, as this may result in unauthorized users intercepting the configuration information.

Figure 2A:
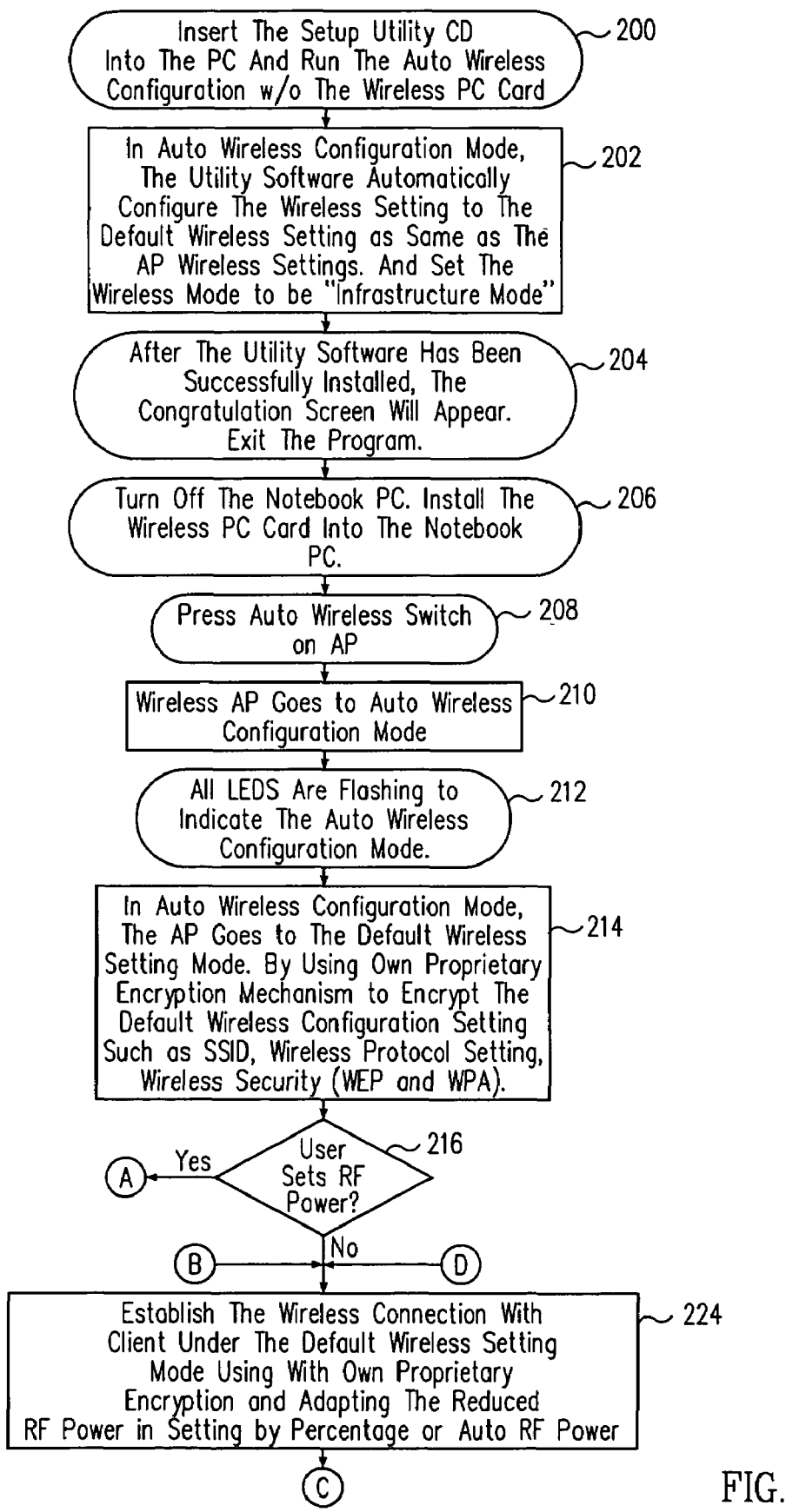
FIGS. 2A-2C are flowcharts illustrating an algorithm for auto-configuring two devices in a wireless network according to another embodiment of the present invention.
Figure 2B:
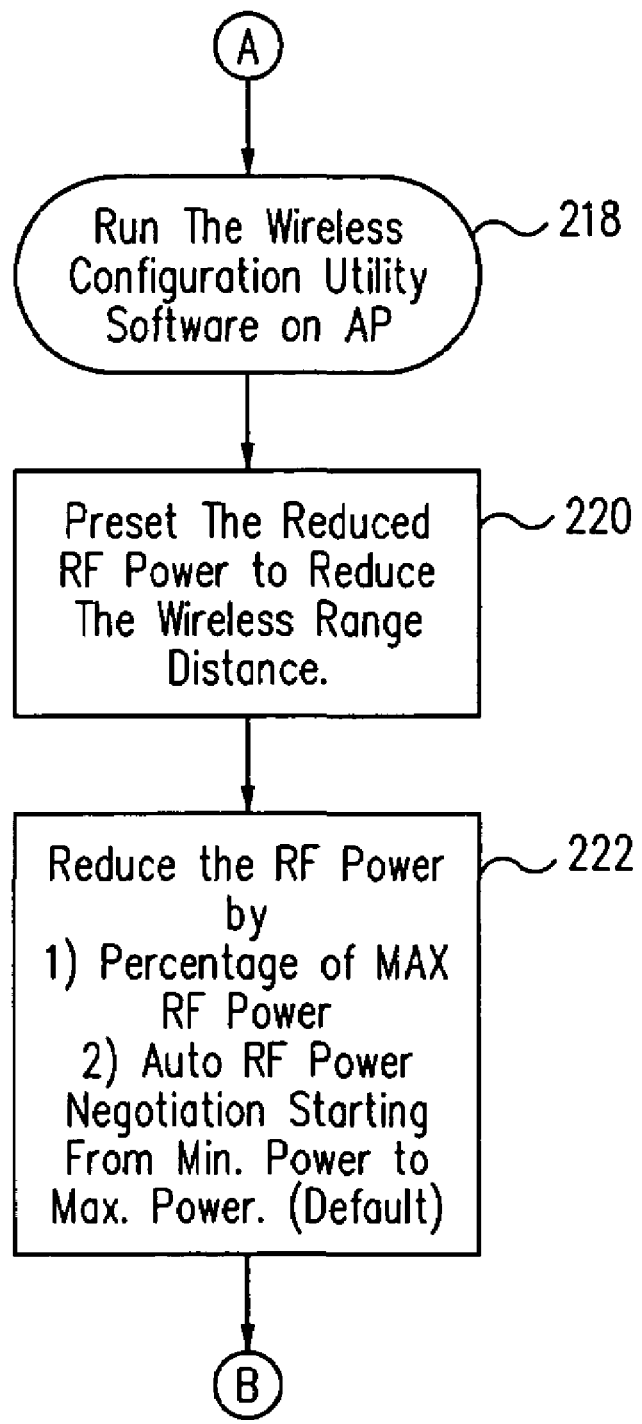
Figure 2C:
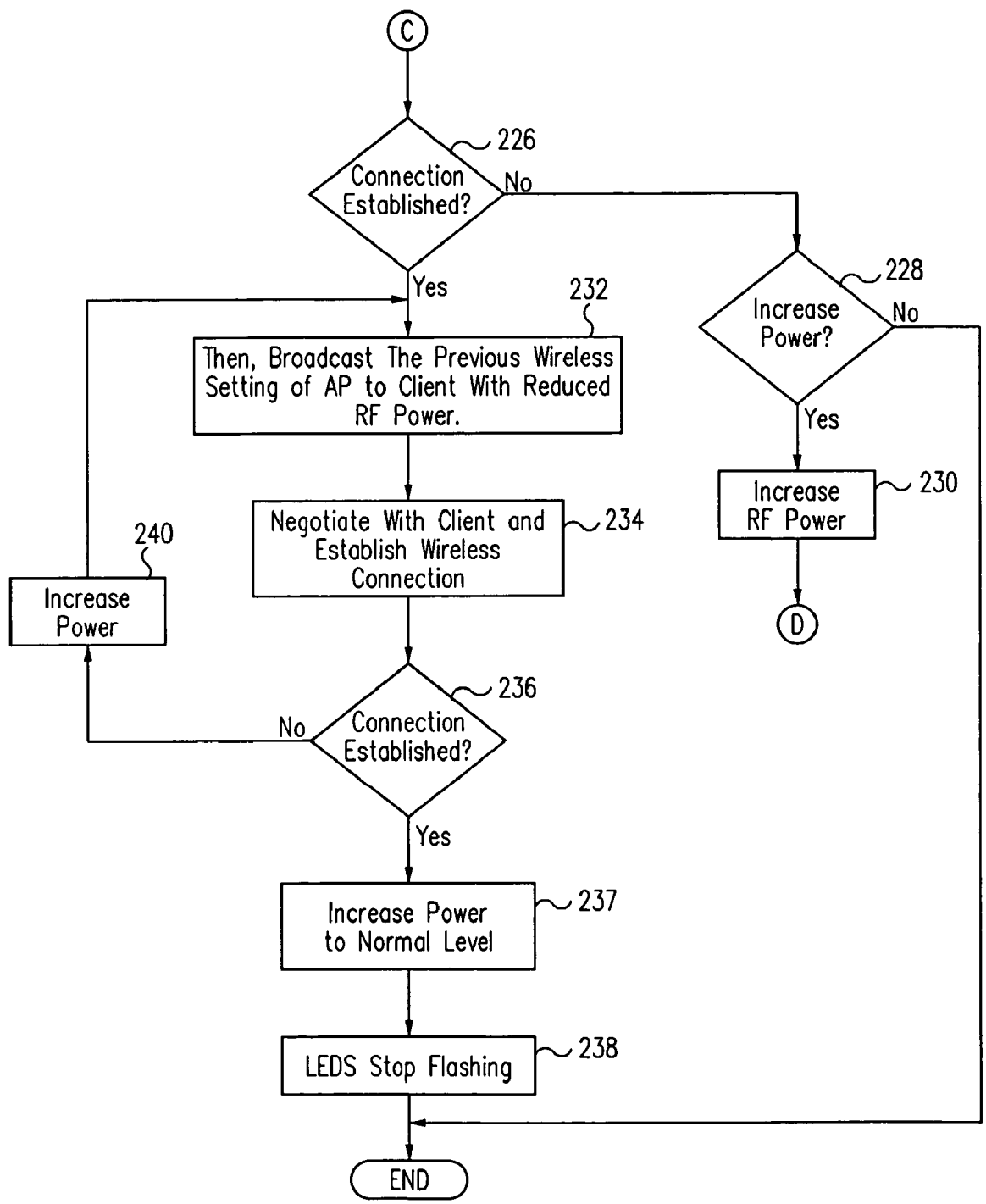

FIGS. 2A to 2C are flowcharts illustrating an algorithm for auto-configuring two devices in a wireless network according to another embodiment of the present invention. As with the embodiment of FIG. 1, the two devices can be an AP and a wireless client, such as a laptop. First, in the wireless client, a setup utility CD is inserted into the laptop, and the auto wireless configuration is run without a wireless PC card in operation 200. The setup utility CD is designed for the specific target wireless client device. Next, in operation 202, the utility software is installed and automatically configures the wireless setting to the default wireless setting. The wireless mode is then set to the infrastructure mode. Once this process is complete, the user is notified, such as by an on-screen display, in operation 204 that installation was successful. The laptop then exits the utility software program. The laptop is now ready for auto-configuration with an AP.

When auto-configuration with an AP in a network is desired, an auto-configuration process is initiated in operation 208, such as by pressing a button on the AP. This causes the wireless AP to enter the auto-configuration mode in operation 210. All LEDs or other indicators on the AP flash, in operation 212, to let the user know that the AP is in the auto-configuration mode. The LEDs may indicate power, Internet connection, and/or a local area network (LAN) connection. In auto-configuration mode, the AP goes to the default wireless setting rode and encrypts the default wireless configuration settings, such as SSID, wireless protocol setting, and wireless security (WEP and WPA), using the AP's own encryption algorithm in operation 214.

In one embodiment, the user can set a reduced power level for transmission of the encrypted configuration settings, as determined in operation 216. If that is the case, the user can set the RF power to a specific lower level in operation 220. This can be done at any time prior to the AP transmitting the encrypted settings, such as during a start-up of the AP to run the configuration utility software. The lower RF power can be a percentage of the maximum RF power or it can be based on the estimated range of the wireless client device. In the latter case, the AP can run a stored program that calculates the anticipated minimum RF power needed to communicate with the wireless client, based on a range input from the user. The user may also select a default setting that the AP uses in the absence of any input from the user. The default setting can be a minimum power calculated for the shortest range of the wireless clients. Thus, in operation 222, the user can select to use either the default setting or a different power level.

Once the reduced RF power level is determined, the AP transmits or broadcasts the encrypted default wireless setting at the reduced RF power in operation 224. The AP then determines, in operation 226, whether the wireless connection with the client was established. If not, the AP determines, in operation 228, whether the RF power should be increased. Situations where the RF power will not be increased further may include reaching a maximum number of power level increases, reaching a maximum power level, or reaching a total time for the re-tries. These and other limiting conditions may be utilized to decrease the chances of unauthorized users intercepting the AP transmissions. If, in operation 228, the AP determines the RF power is not to be increased, the auto-configuration process ends. Failure to establish a connection may happen for various reasons, such as when the client decides not to join the network and moves out of the network or when the client has a malfunction.

However, if the AP determines that RF power can be increased, the RF power is increased in operation 230, and the encrypted default wireless setting is again transmitted by the AP in operation 224. The RF power can be increased in any number of suitable methods, such as, but not limited to a fixed percentage of the previous RF power level. The RF power is continually increased until a connection is established or the RF power can no longer be increased.

Once a connection using the encrypted default settings is established, the AP globally broadcasts, in operation 232, the previous settings of the AP to the client at the current reduced RF power. In operation 234, the AP negotiates with the client, using conventional protocols, to establish a wireless connection. The wireless connection is established under the condition of the previous AP wireless setting mode with or without wireless security, e.g., WEP, WPA (PSK/AES), which was set up previously with reduced RF power, but no proprietary encryption. The AP then determines, in operation 236, whether the wireless connection with the client has been established. If the communication is established, the AP increases the RF power back to a normal level in operation 237. The LEDs or other indicators stop flashing in operation 238 to notify the user that the auto-configuration is complete. The power LED may remain on. The wireless client is now associated with the network and can communicate securely with and through the AP. However, if in operation 236, the AP determines that no connection was established, the RF power is increased in operation 240. In one embodiment, the AP continues to increase the power until a connection is established or the maximum RF power is reached. In other embodiments, different thresholds or criteria can be used to determine the number of attempts or power level increases. In one embodiment, the total time for the auto-configuration process is around 30 seconds or less. If no connection is established, the auto-configuration process is terminated.

Figure 2D:
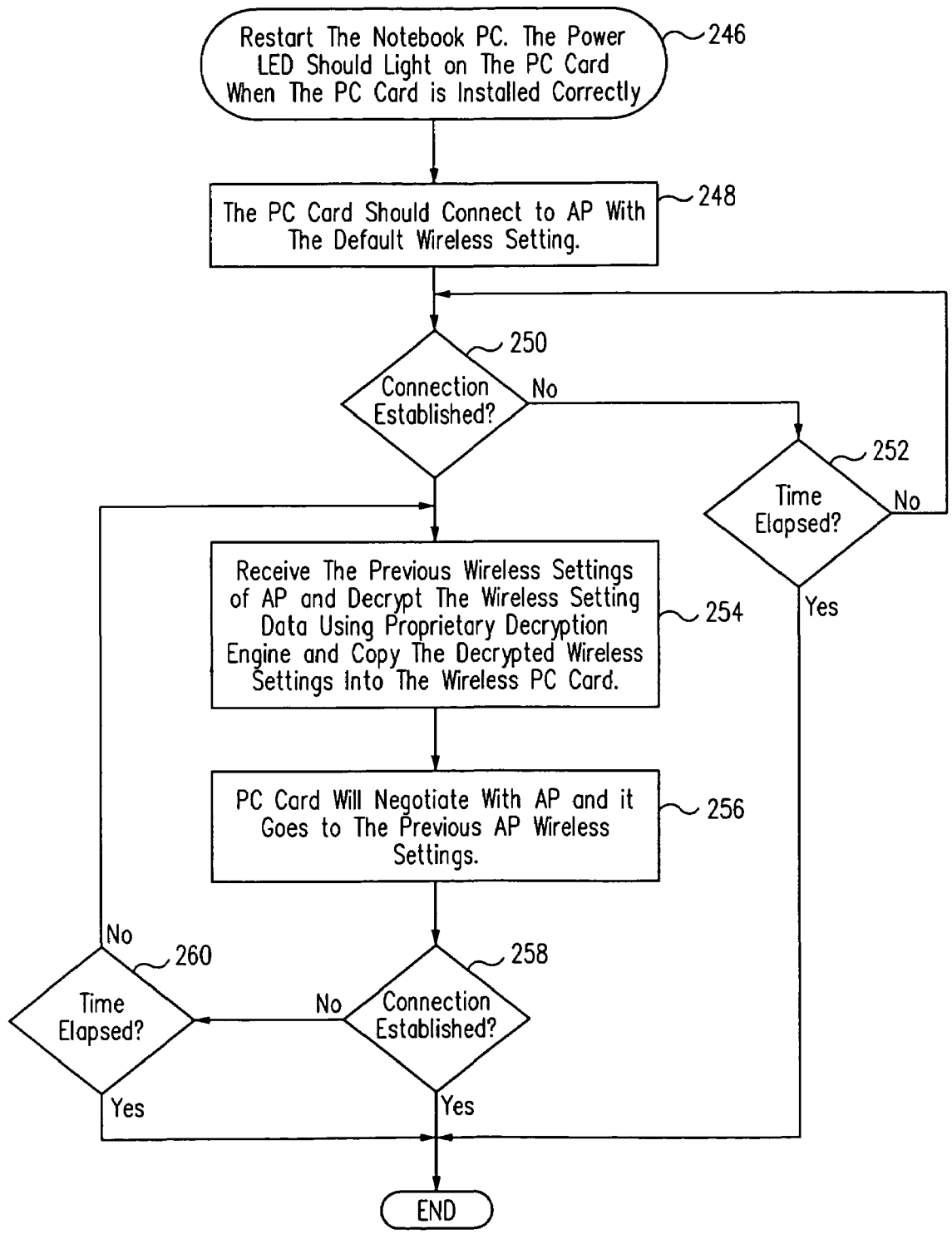
FIG. 2D is a flowchart illustrating a process for the wireless device corresponding to the process described in FIGS. 2A-2C.

FIG. 2D is a flowchart illustrating a process for the wireless device corresponding to the process described in FIGS. 2A-2C. Shortly before or after operation 208, in which the auto-configuration in the AP is initiated, the client or wireless laptop with the wireless PC card is restarted in operation 246. Once the PC card is installed correctly, an indicator, such as an LED, is lit to notify the user of a correct installation. The PC card in the laptop then attempts to establish a connection to the AP with the encrypted default wireless setting in operation 248. The encrypted default setting is broadcast by the AP with a reduced RF power so that only devices within a limited range can receive the transmission.

In operation 250, The client determines if a wireless connection has been established. One reason why a connection has not been established may be that the RF power from the AP was too low so that the client was out of range of the transmission. If not connection is established, the AP increases its RF power and retransmits the default settings. On the client side, the client determines, in operation 252, whether a pre-determined time has elapsed. This pre-determined time, as discussed above with respect to the AP, is the amount of time the client will wait to see if a wireless connection is established. This time, in one embodiment is less than 30 seconds, such as 20 seconds. If the pre-determined time has not elapsed, the client continues checking whether a connection is established. However, if the pre-determined time has elapsed, the client terminates the auto-configuration process.

If a wireless connection is established, the client receives the previous encrypted wireless setting data at the reduced power from the AP in operation 254. The client decrypts the wireless setting data using its decryption engine, loaded from the auto-configuration program from its setup utility CD. The decrypted settings are then copied into the wireless PC card. Next, in operation 256, the PC card will negotiate with the AP, such as using standard association protocols, to establish a wireless connection. If no connection is established, as determined in operation 258, the client device determines in operation 260 whether a pre-determined time has elapsed. This pre-determined time may be, in one embodiment, the total time the AP is instructed to transmit RF power during the auto-configuration mode. If the time period has not elapsed, the client waits to receive the wireless settings from the AP and attempts to establish a connection in operations 254 and 256. However, if the time period has elapsed, the client ends the auto-configuration process.

Figure 3:
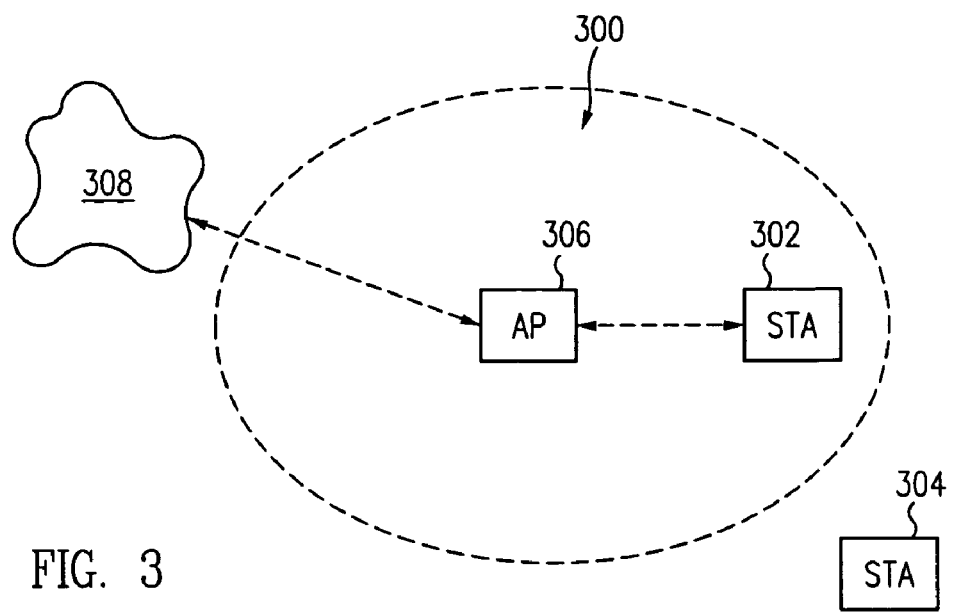
FIG. 3 a block diagram of a wireless network according to one embodiment for utilizing the auto-configuration algorithms of the present invention.

FIG. 3 shows a block diagram of a wireless network 300 according to one embodiment for utilizing the auto-configuration algorithms discussed above. Network 300 includes a wireless client device or station (STA) 302, a second "unauthorized" user or station (STA) 304, and a root AP 306 with which the client is to be associated. Note that AP 306 can be any suitable device, such as a router. Root AP 306 provides access to other networks, such as the Internet 308. Root AP 306 and client 302 are confined to a space 310, such as an office, house, or room. User 304 is located outside space 310, such as on a street or sidewalk adjacent the office, house, or room.

Network 300 can be of different types of wireless LANs, including those conforming to the IEEE 802.11 standard, such as 802.11(a), 802.11(b), and 802.11(g). 802.11 conformant networks typically include a plurality of Basic Service Sets (BSSs), with each BSS capable of having multiple wireless stations and an access point. The stations can be any device that can function within the 802.11 protocol, e.g., with physical layer (PHY) interfaces to the wireless medium and Media Access Control (MAC) that utilizes Carrier Sense Multiple Access with Collision Avoidance (CSMA/CA) protocol. Examples of suitable devices include laptop PCs, desktop computers, and handheld devices, such as PDAs. These devices can be mobile, portable, or stationary. AP devices also contain 802.11 conformant MAC and PHY interface to the wireless medium and provide access to a distribution system for associated stations.

According to one embodiment, client 302 wishes to associate with AP 306 in the network, such as when the client enters into network 300 or is powered up after a shut-down. Before client 302 can begin communication or sending data through an AP within a wireless network, it must associate itself with an AP. A wireless client typically invokes the association service only once, e.g., when it enters a BSS or after power-up. Each wireless device can associate with one AP, while many devices can be associated with a single AP. In a typical association process, client 302 obtains configuration information, which can be an infrastructure mode, in which an AP in the BSS facilitates communication between wireless devices.

Once the root AP initiates an auto-configuration process, it sends out an encrypted default wireless configuration setting at a reduced RF power. The setting contains information about the AP and communication channel, such as the SSID, wireless protocol setting, and wireless security. In response to the AP transmission, the client, upon receipt and decryption, transmits an association request to the AP.

Once an AP, such as root AP 306 is found, client 302 associates with that AP. Wireless client 302 transmits an association request. When this is received by AP 306, the AP transmits an association response, again at a reduced RF power. The AP transmissions during the auto-configuration process only last a short period of time, such as less than 30 seconds. Client 302 joins the network and begins communication with root AP 306 once it receives and loads the wireless settings. Client 302 can now communicate within the network and to the Internet through root AP 306.

Thus, the present invention greatly reduces the chances of unauthorized reception of network information by the using reduced power. Even though the wireless configuration settings are encrypted and connect for a short period of time, there are some vulnerable issues for hackers to de-encrypt the wireless configuration setting due to using pre-setting proprietary encryption mechanisms. One issue is that the wireless range distances of 802.11(b) or 802.11(g) technology are about 300 feet or more. Therefore, these 802.11 compliant devices, such as APs, can transmit with sufficient power to communicate with wireless devices more than 300 feet away. As a result, there may be numerous unwanted devices, such as user 304, that can potentially receive and decrypt network settings. For example, user 304 may be a neighbor in the home or office or even someone "sniffing" in your network.

In order to establish more secure wireless configuration, the wireless AP configuration software can be set to transmit a reduced wireless RF power. By reducing the RF power, the wireless configuration settings will only be receivable by devices within a shorter range, e.g., 30 feet, as compared to over 300 feet. This greatly reduces the number of unauthorized devices within the range of the AP transmissions. The RF power can be optimized so that the intended wireless client is at or near the maximum range of the transmission. Consequently, the wireless broadcast signal cannot reach to unauthorized users outside this small space.

Figure 4:
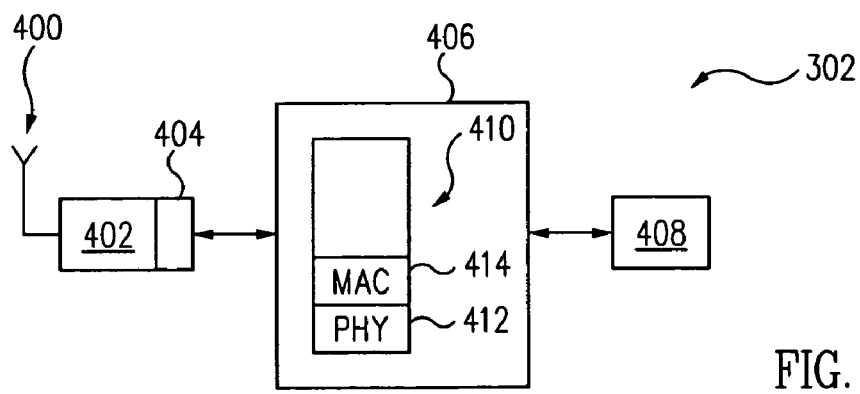
FIG. 4 is a block diagram of a wireless station in FIG. 3 according to one embodiment of the invention.

FIG. 4 shows a block diagram of wireless station 308 according to one embodiment of the invention. Wireless station 302 includes an antenna 400, a wireless transceiver 402 having baseband and RF circuitry, interface circuitry 404, a processor 406, and a memory 408. Transceiver 402 provides and accepts MAC frames to/from a protocol stack 410 in processor 406. When the wireless station is associated with an AP in the network, interface circuitry 404 provides a bi-directional interface to the network, i.e., a connection point to the AP at the wireless station. Memory 408 may include volatile, e.g., DRAM, and non-volatile memory, e.g., SRAM. Protocol stack 410 includes a network layer comprising an 802.11 PHY layer 412 and an 802.11 MAC layer 414. Components within wireless station 402 may implement the acts or operations described herein for automatically configuring the wireless station with an AP for use in the network.

Figure 5:
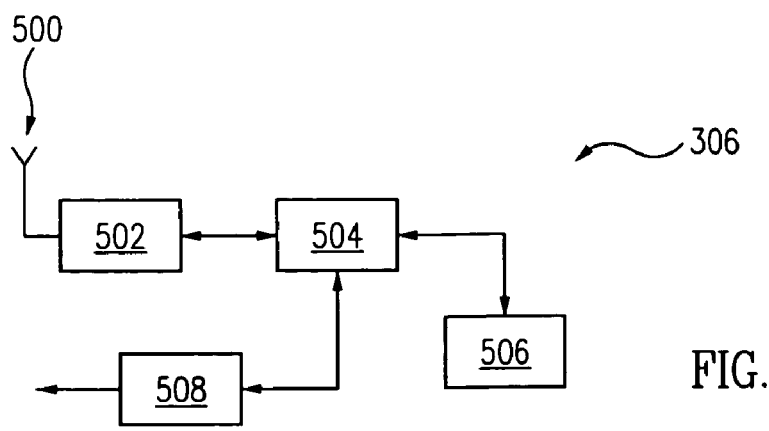
FIG. 5 is a block diagram of an AP in FIG. 3 according to one embodiment.

FIG. 5 shows a block diagram of an AP 306 according to one embodiment. AP 306 includes an antenna 500, a wireless LAN transmission/reception unit 502, a packet processing unit 504, a memory 506, and a network transmission/reception unit 508. Wireless LAN transmission/reception unit 502 transmits/receives packet data to/from the wireless LAN network through antenna 500. Packet processing unit 504 performs processing of the wireless LAN access point, e.g., processing of reception data transmitted from the wireless LAN transmission/reception unit 502 and processing of data transmitted to the wireless LAN client. Memory 506 includes information for MAC addresses and other suitable information needed for 802.11 compliant systems. Packet processing unit 504 can change addresses and other information within memory 506. Network transmission/reception unit 508 transmits/receives a packet through a wired network such as Ethernet, ADSL, or the like, and is thus not needed if there is no wired network connection required. Components within repeater AP 306 may implement the operations described herein for automatically configuring the access point and a wireless station or client.

The invention is suitable for different types of wireless LANs, including those conforming to the IEEE 802.11 standard, such as 802.11(a), 802.11(b), and the working drafts such as 802.11(g) and 802.11(e) with APs having extended capability to support channel loading measurement.

Having thus described embodiments of the present invention, persons skilled in the art will recognize that changes may be made in form and detail without departing from the scope of the invention. Thus the invention is limited only by the following claims.

What is claimed is:

1. A method of communication in a wireless network including a wireless station and an access point (AP), the method comprising:
    initiating configuration between the wireless station and the AP;
    transmitting, by the AP, configuration settings at a reduced RF power from the default maximum RF power of the AP;
    determining if a connection is established after the transmitting;
    increasing the previous reduced RF power;
    transmitting, by the AP, configuration settings at the increased RF power;
    establishing a connection between the wireless station and the AP; and
    increasing the RF power of the AP for communication between the wireless station and the AP.

2. The method of claim 1, further comprising encrypting, by the AP, the configuration settings before transmitting at the reduced power.

3. The method of claim 2, further comprising decrypting, by the wireless station, the transmitted configuration settings.

4. The method of claim 1, wherein the reduced RF power is dependent on the distance of the wireless station to the AP.

5. The method of claim 1, further comprising repeating the determining, increasing the previous reduced RF power, and transmitting at the increased RF power until a connection is established or a threshold is reached.

6. The method of claim 5, wherein the threshold is selected from the group consisting of maximum number of tries, maximum RF power, and maximum time spent in establishing a connection.

7. The method of claim 1, wherein the network is an 802.11 network.

8. The method of claim 1, wherein the configuration is art auto-configuration algorithm.

9. An access point (AP) in a wireless network comprising a wireless station, the AP comprising:
    an antenna adapted to receive packets from and transmit packets to the wireless station, wherein the packets contain configuration setting information;
    a processor coupled to the antenna for processing the packets received from the wireless station, wherein the processor determines a reduced power to transmit the packets; and
    a transmitter adapted to transmit configuration setting information at the reduced power, wherein the processor is adapted to determine if a connection is established after transmitting at the reduced power and increases the previous reduced RF power, and wherein the transmitter is adapted to transmit configuration settings at the increased RF power and increase RF power for communication between the AP and the wireless station.

10. The AP of claim 9, wherein the processor is adapted to increase the reduced power until a connection is established between the AP and wireless station or when a threshold is reached.

11. The AP of claim 9, wherein the processor is adapted to encrypt the configuration setting information prior to transmitting the information.

* * * * *